United States Patent [19]

Shimada et al.

[11] Patent Number: 5,380,105
[45] Date of Patent: Jan. 10, 1995

[54] SPELL CHECK MODULE WITH INTERNAL CPU

[75] Inventors: Naoki Shimada, Tokyo; Kiyoshi Katano; Hiroyuki Ueda, both of Yokohama, all of Japan

[73] Assignee: Canon Kabushiki Kaisha, Tokyo, Japan

[21] Appl. No.: 29,352

[22] Filed: Mar. 10, 1993

Related U.S. Application Data

[63] Continuation of Ser. No. 951,950, Sep. 28, 1992, abandoned, which is a continuation of Ser. No. 860,126, Mar. 31, 1992, abandoned, which is a continuation of Ser. No. 466,489, Jan. 17, 1990, abandoned.

[30] Foreign Application Priority Data

Jan. 26, 1989 [JP] Japan .................. 1-15088

[51] Int. Cl.6 .................. G06F 3/02; G06F 7/02
[52] U.S. Cl. .................. 400/63; 400/692; 364/419.12
[58] Field of Search .......... 400/63, 74; 364/419.11, 364/419.12

[56] References Cited

U.S. PATENT DOCUMENTS

| | | | |
|---|---|---|---|
| 4,651,300 | 5/1987 | Suzuki | 400/63 |
| 4,829,472 | 5/1989 | McCourt | 400/63 |
| 4,933,896 | 6/1990 | Sakai | 400/76 |
| 4,934,851 | 6/1990 | Sasaki | 400/63 |
| 4,980,855 | 12/1990 | Kojima | 400/63 |

FOREIGN PATENT DOCUMENTS

| | | | |
|---|---|---|---|
| 0076909 | 4/1983 | European Pat. Off. | 400/63 |
| 0187454 | 7/1986 | European Pat. Off. | 400/63 |
| 3115084 | 2/1982 | Germany | 400/692 |
| 3214117 | 11/1982 | Germany | 400/692 |
| 3616529 | 11/1986 | Germany | 400/692 |
| 0267769 | 5/1988 | Germany | 400/63 |
| 59-469 | 4/1984 | Japan | 400/692 |
| 265357 | 11/1988 | Japan | 400/63 |
| WO8802886 | 4/1988 | WIPO | 400/63 |

Primary Examiner—David A. Wiecking
Assistant Examiner—Steven S. Kelley
Attorney, Agent, or Firm—Fitzpatrick, Cella, Harper & Scinto

[57] ABSTRACT

A document processing apparatus includes a first determining unit including a CPU for verifying the spelling of a word while referring to the first correct spelling information stored in a first spelling dictionary; a second determining unit including its own CPU for verifying the spelling of a word different from those stored in the first spelling dictionary while referring to the second correct spelling information stored in a second spelling dictionary; a connection unit for detachably connecting the second determining unit to the apparatus main body; and a switch for switching the spelling verification determining process between the first and second determining units in accordance with the connection state of the second determining unit relative to the connection unit.

58 Claims, 10 Drawing Sheets

(I) THIS (II) THIS IS (III) THIS IS OUR (IV) THIS IS OUR NEW (V) THIS IS OUR NEW PRODUCT

SPELL CHECK MODULE WITH INTERNAL CPU

This application is a continuation of application Ser. No. 07/951,950, filed Sep. 28, 1992, now abandoned, which is a continuation of application Ser. No. 07/860,126, filed Mar. 31, 1992, now abandoned, which is a continuation of application Ser. No. 07/466,489, filed Jan. 17, 1990, now abandoned.

BACKGROUND OF THE INVENTION

1. Field of the Invention

The present invention relates to a document processing apparatus which verifies the spellings of input character strings whether there is a misspelling or not.

2. Related Background Art

There is known a document processing apparatus such as an electronic typewriter having a spelling verification function (hereinafter called SV) to check input word spelling and to determine if there is any misspelling or not.

With a document processing apparatus of this type, a language which can be checked is limited only to a single language and not to a plurality of different languages.

It is now becomming common for a document processing apparatus to process not only a single language but also a plurality of different languages.

It can also be expected that a high performance SV process will be realized practically as the SV technique advances in the future.

In such document processing environments, the function of a document processing apparatus which can process a plurality of languages cannot be fully utilized if the spelling of a single language only is allowed to be checked. If the SV function allowing the check of words of various languages is to be realized, additional functions for the various languages should be fully equipped, resulting in a considerable adverse effect on manufacturing steps and production cost.

World-wide communications, increasingly use documents which are made not only with a single language but also with a plurality of different words, such as in the case of a composite document for product explanation in different languages. If the spelling of only a single language is checked, the other spellings of different languages are left unchecked.

Since the document processing apparatus is used in various fields by an operator, the particular requirements of these different fields cannot be met with a conventional apparatus and the spelling check for all languages cannot be afforded.

Further, it is also necessary to provide an apparatus which can be used by an operator who uses only a signal language.

Further, hardware for a conventional apparatus has no connection unit for the addition of extended functions expected by future SV processes, so that a user loses a desire to buy it or is forced to replace it with a new one by paying a fee.

SUMMARY OF THE INVENTION

The present invention has been made in consideration of the above problems. It is an object of the present invention to provide a document processing apparatus capable of checking the spelling of a plurality of different languages and having hardware which allows the use of the future SV processing functions expected to be developed, by externally connecting a desired second spelling verifier different from a first spelling verifier built into the apparatus.

According to the present invention, when a second determining means is connected to the connection unit, the switching means switches the spelling check process from the first determining means to the second determining means. The second determining means verifies the spelling of a word cut out by the cutting-out means while referring to the second correct spelling information stored in a second spelling dictionary memory. If there is any misspelling, the user is notified by notifying means.

Further, when the second determining means is connected to the connection unit, the selection means selects either the first or second determining means, and the indicating means indicates either the external or internal as the access destination for the document processing, in accordance with the selection state selected by the selection means. Either the first or second determining means thereby executes the spelling verification process.

Furthermore, by detachably connecting the second spelling dictionary memory to the connection unit, the memory can be accessed from the second determining means which in this case mounted within the apparatus.

DESCRIPTION OF THE PREFERRED EMBODIMENTS

1st Embodiment

Figure 1:
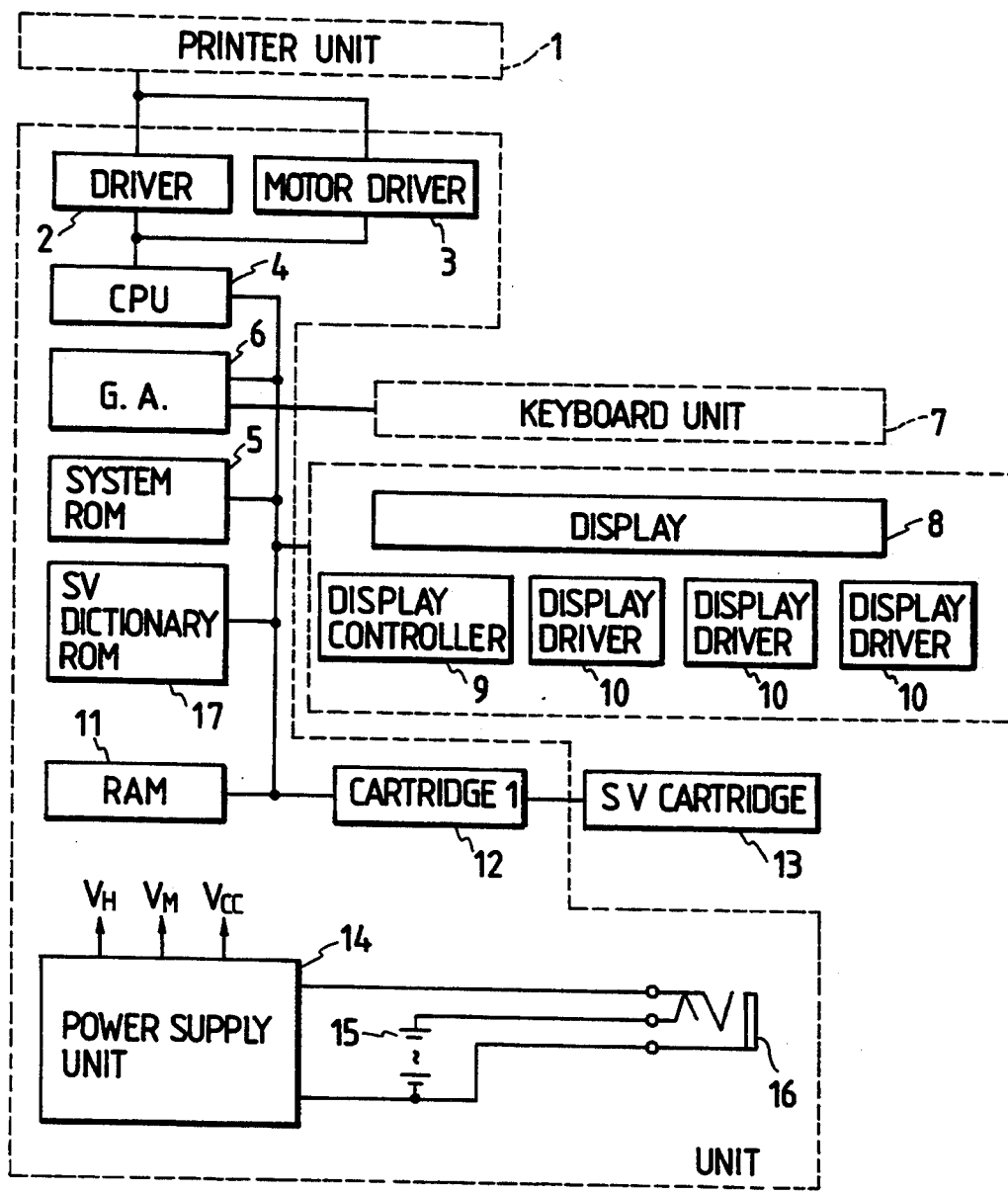
FIG. 1 is a block diagram of a document processing apparatus according to the first embodiment of this invention.

FIG. 1 is a block diagram of a document processing apparatus according to the first embodiment of this invention, an electronic typewriter being used as an example of the document processing apparatus.

In FIG. 1, reference numeral 1 represents a printer unit of a thermal transfer type, 2 denotes a driver for driving the thermal head of the printer unit, 3 a motor driver for powering a carrier unit for the motion of the head and powering a paper feed mechanism, and 4 denotes a CPU which performs document input and document editing process, an SV process and a print process in accordance with control programs stored in a system ROM 5. Reference numeral 6 represents a gate array (G.A.) which processes key codes input from a keyboard unit 7. Reference numeral 8 represents a display constructed of LCDs or the like which displays thereon input character strings, alarm messages, edit data (such as column, line, tab, mode and the like), cursor and other data. Reference numeral 9 represents a display controller which controls display drivers 10 for the display operation of the display 8.

Reference numeral 11 represents a RAM which provides working areas necessary for CPU 4 to process data, and can store a predetermined amount of input documents, e.g., 64K bytes (about 6000 characters).

Reference numeral 12 represents a cartridge connector serving as a connection unit to which an SV cartridge 13 serving as the second dictionary memory is connectable. Reference numeral 14 represents a power supply unit which supplies reference potentials Vh, Vm and Vcc from a battery 15 or an AC power source. Reference numeral 16 represents a connector to which an AC plug (not shown) is connectable. Reference numeral 17 represents an SV dictionary ROM serving as the first spelling dictionary memory of this invention which stores therein the data to be used for the check of word spellings input from the keyboard 7. CPU 4 also serving as first determining means, cutting-out means, and notifying means determining if the spelling of a cut-out word is correct or not while referring to the SV dictionary ROM 17.

When the SV cartridge (including second judgement means) is connected to the connection unit, switching means to be described later switches the spelling verification determining process by the first judgement means to that by the second determining means. The second determining means verifies the spelling of a word cut out by cutting-out means while referring to the second correct spelling information stored in the second spelling dictionary memory. If there is a misspelling, notifying means notifies the user of such effect.

When the second spelling dictionary unit (SV cartridge 13) storing the correct spelling information, which is different from a CPU 31 serving as the second determining means to be described later and/or the first correct spelling information (SV dictionary ROM 17), is connected to the cartridge connector 12 serving as the connection unit, CPU 4 serving also as the switching means switches the spelling verification determining process by the first determining means to that by the second determining means. The second determining means verifies the spelling of a word cut out by CPU 4 while referring to the second spelling dictionary memory (dictionary ROM 33 stored in the SV cartridge 13, to be described later). If there is any spelling mistake, such result is displayed on the display 8, and CPU 4 notifies an operator of such effect by means of a buzzer or the like.

The second correct spelling information may be the correct spelling information of another language different from that of the first correct spelling information, or may be the extended information of the same language as that of the first correct spelling information (the extended information means additional spelling check information for extending the capacity of the first correct spelling information, such as high performance correct spelling information having spell checker or the like). With the addition of such value-added information for flexibly dealing with the advancement of future spelling verification function, the SV process function of the apparatus can be enhanced.

In the following description, the second correct spelling information is assumed for the information of another language different from that of the first correct spelling information. The invention however is not limited thereto.

Figure 2A:
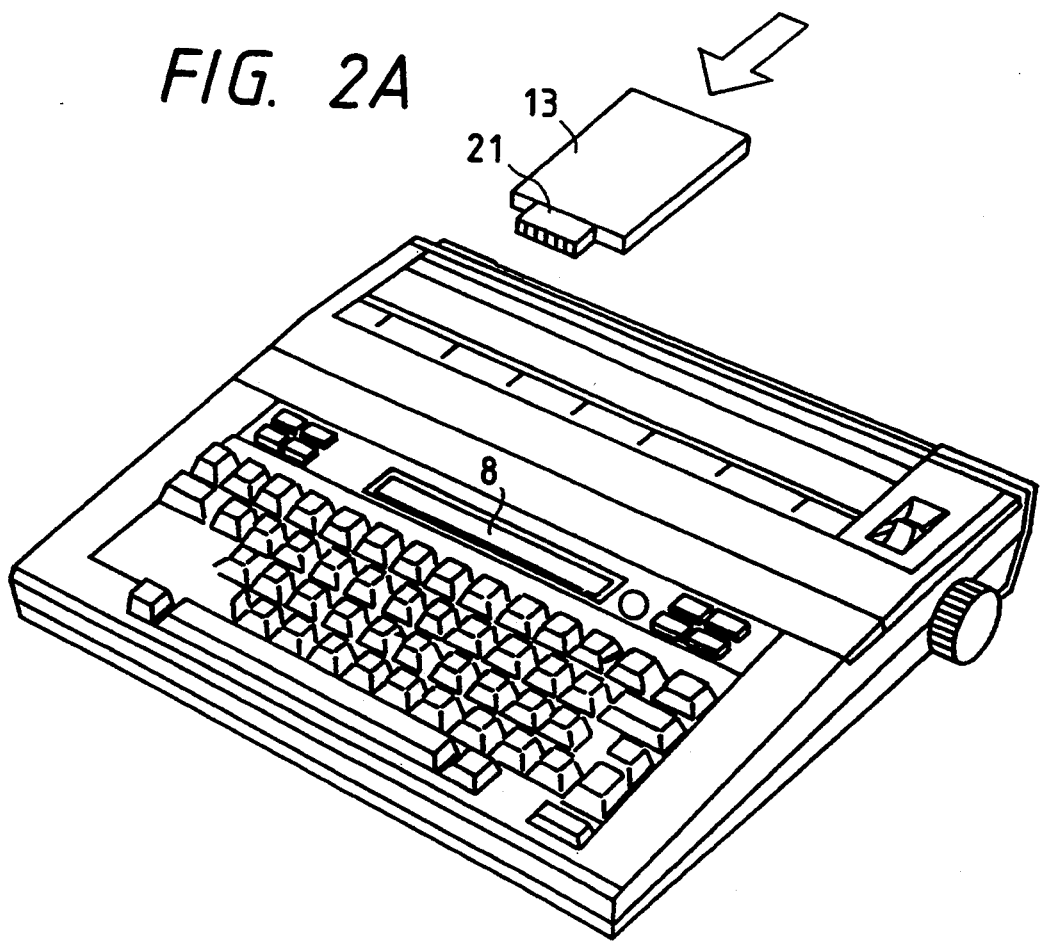
FIGS. 2A and 2B are the perspective view of the electronic typewriter shown in FIG. 1 and the cross section showing the main part thereof.
Figure 2B:
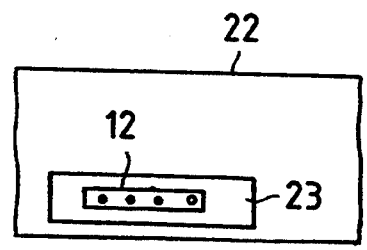

FIGS. 2A and 2B are the perspective view of the electronic typewriter shown in FIG. 1 and the cross section showing the main part thereof. Like parts to those shown in FIG. 1 are represented by using identical reference numerals.

In FIGS. 2A and 2B, the connector 21 of the SV cartridge 13 is connected to the cartridge connector 12 through a receptacle 23 mounted on the main body 22 of the apparatus.

Figure 3:
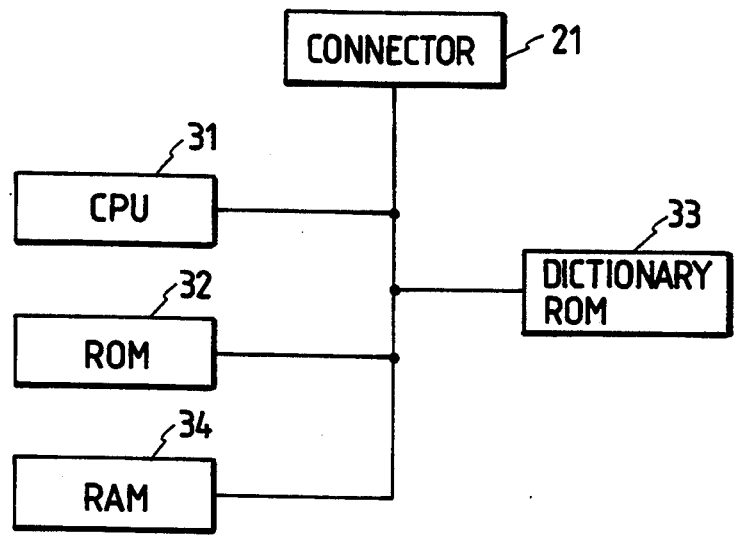
FIG. 3 is a circuit block diagram showing the structure of the SV cartridge shown in FIG. 2.

FIG. 3 is a circuit block diagram of the SV cartridge 13 shown in FIG. 2. Like parts are represented by using identical reference numerals.

In FIG. 3, reference numeral 31 represents a CPU which operates to transfer the second correct spelling information stored in a dictionary ROM 33 to CPU 4 in the main body 22 via the connector 21, in accordance with the control programs stored in a ROM 32 and shown in the flow chart described later. The connector 21 is supplied with a power source for the operation thereof and the data transfer to and from the main body 22.

Reference numeral 4 represents a RAM which provides a storage area necessary for CPU 1 to process data.

Figure 4:
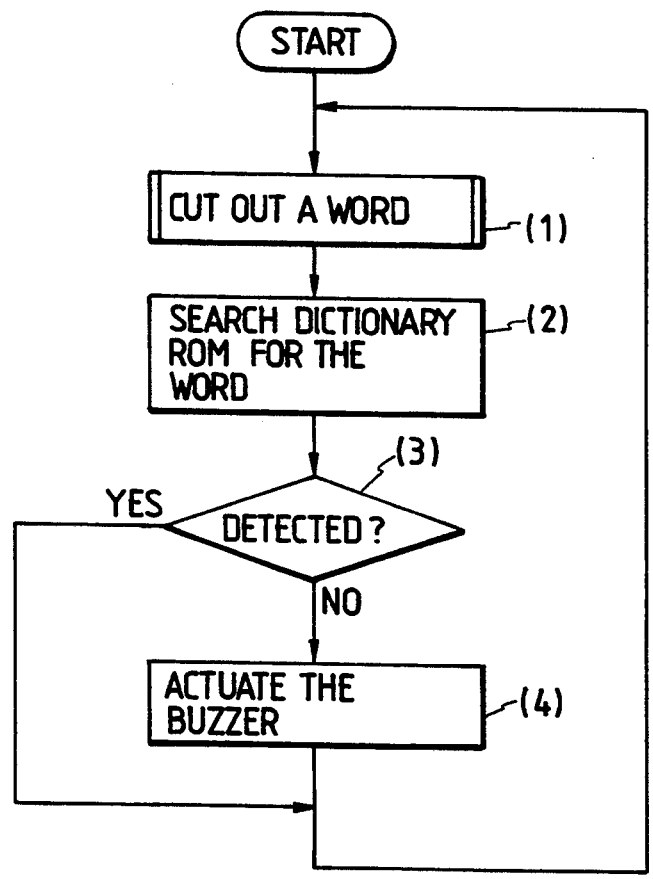
FIG. 4 is a flow chart showing an example of the spelling vertification procedure of this invention.

Next, the spelling verification processes will be described with reference to the flow chart of FIG. 4 which shows an example of the spelling verification procedure of this invention. The flow includes steps (1) to (4).

First, an operator acts upon the keyboard unit 7 to cut out a word between spaces from the input document (step 1). The spelling verification is to check if the spelling of a cut-out word is correct or not. To this end, the data in the dictionary ROM (either dictionary ROM 33 or SV dictionary ROM 17) are searched to check if the cut-out word is present in the dictionary (step 2).

Next, it is determined whether or not the cut-out word is present in the dictionary (step 3). If YES, it is determined that the cut-out word is correct and the flow returns to step 1. If NO, it is determined that the cut-out word is not correct, so that a buzzer (not shown) is caused to sound (step 4) to notify the operator of a misspelling and the flow returns to step 1.

The spelling verification processes will be further described with reference to FIG. 5 and FIGS. 6A and 6B. It is assumed that the operator inputs a document by using a first language, and then inputs another document by using a second language.

Figure 5:
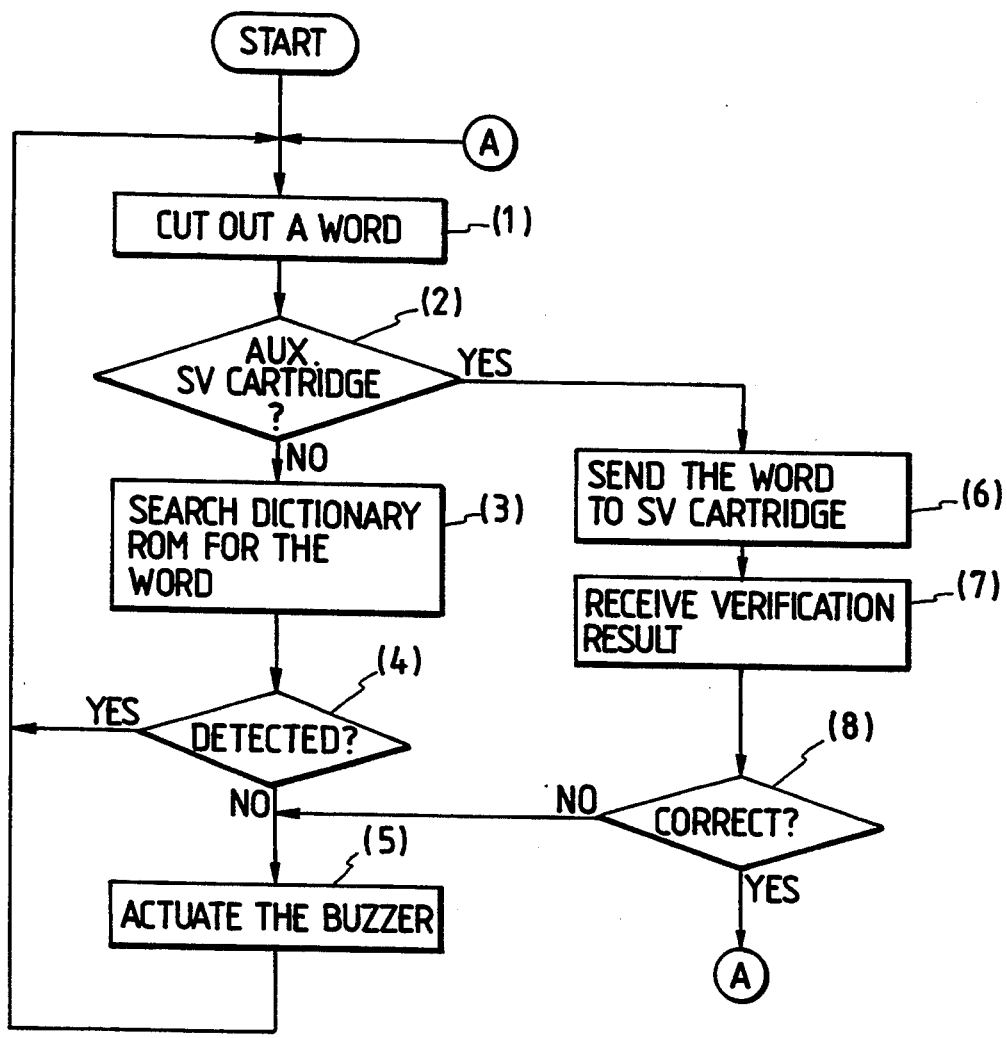
FIG. 5 is a flow chart showing an example of the spelling verification procedure of this invention.

FIG. 5 is a flow chart showing an example of the spelling verification procedure of this invention, the flow including steps 1 to 8.

An operator inputs a document by using the keyboard unit 7 shown in FIG. 1. The input document is temporarily stored in RAM 11 shown in FIG. 1 and displayed on the display 8 shown in FIG. 2. A word is cut out from the input document (step 1). Next, it is checked if the SV cartridge 13 is being connected, i.e., it is checked if there is external SV (step 2). If NO, i.e., if the document was inputted by using the first language, the cut-out word is searched within the data base SV dictionary ROM 17 (step 3). It is checked if the cut-out word is present in the SV dictionary ROM 17 (step 4). If YES, the flow returns to step 1 to perform a spelling verification for the next word. If NO, a buzzer is caused to sound to notify the operator a misspelling and the flow returns to step 1.

After completion of inputting the document by using the first language, the user connects the SV cartridge 13 to the main body 22 shown in FIG. 2 in order to input another document by using the second language. This connection can be made by inserting the connector 21 to the cartridge connector 12, so that the SV cartridge 1 and the electronic typewriter are electrically connected to each other via the cartridge connector 12.

Thereafter, a document starts being inputted. The cutting-out operation of a word from the input document is the same as described above. The determination at step 2 in this case is YES so that the cut-out word is sent to the SV cartridge 13 whereat it is determined if the spelling of the sent and cut-out word is correct or not. Next, CPU 4 in the main body 22 receives the spelling determination result of the sent word (step 7).

It is then determined if the received determination result indicates a correct or incorrect spelling (step 8). If YES, the flow returns to step 1, whereas if NO, the flow returns to step 5 to notify the operator of such effect.

Figures 6A, 6B:
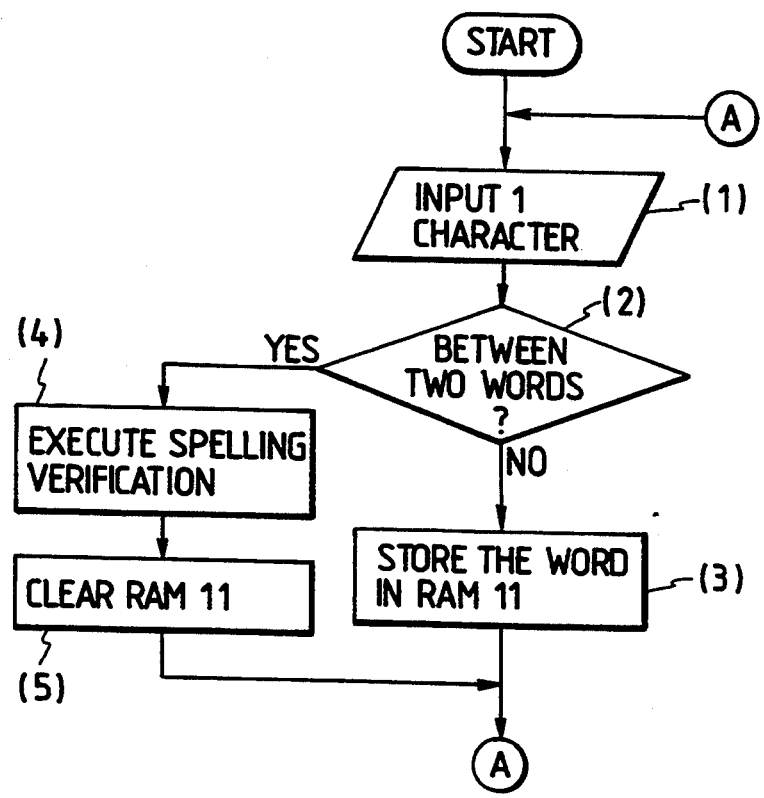
FIG. 6A shows an example of character strings input from the keyboard shown in FIG. 1.
FIG. 6B is a flow chart showing an example of the word cutting-out procedure of this invention.

FIG. 6A shows an example of character strings input from the keyboard unit 7 shown in FIG. 1. At the input stages (I) to (V), the words "This", "is", "our", "new" and "Product" were inputted one after another in this order.

FIG. 6B is a flow chart showing an example of the word cutting-out procedure of this invention, the flow including steps 1 to 5.

This flow runs while the operator inputs the character strings in accordance with the input stages (I) to (V). Upon inputting a character from the keyboard unit 7 (step 1), it is checked if the input character is a partition between words (e.g., a blank code) (step 2). If NO, the input character is stored in an SV storage area (RAM 11) (Step 3), and the flow returns to step 1 to wait for the next input character.

If YES at step 2, namely if a space is inputted (depression of the space key) after inputting "This" at the word input stage (I) shown in FIG. 6A, a spelling verification process is executed for the word "This" stored in RAM 11 (step 4), and thereafter, the contents of the SV storage area (RAM 11) are cleared (step 5). The flow returns to step 1 to repeat similar operations for the determination as to the correct or incorrect spelling of the words input at the word input stages (II) to (V).

Figure 7:
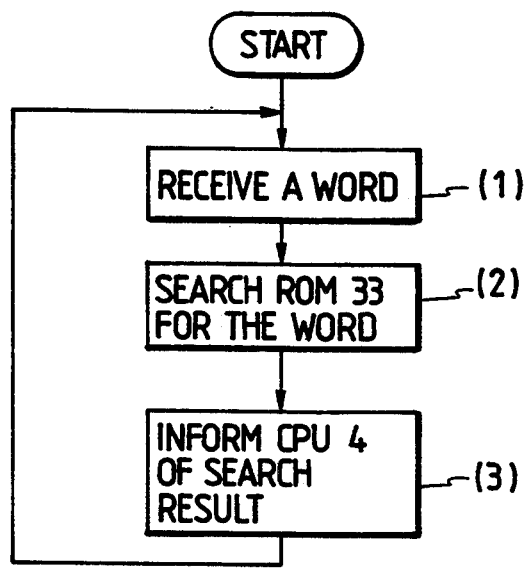
FIG. 7 is a detailed flow chart showing an example of the procedure executed by the SV cartridge shown in FIG. 2.

FIG. 7 is a detailed flow chart showing an example of the procedure performed by the SV cartridge 1 shown in FIG. 2, the flow including steps 1 to 3.

When a word is sent from the main body 22 via the connector 21, this word is received (step 1). The data base dictionary ROM 33 of the SV cartridge 1 is searched if the received word is present therein (step 2). Next, the search result is notified to CPU 4 of the main body 22 via the connector 21 (step 3) to thereafter return to step 1.

In the above embodiment, when the SV cartridge 13 is connected, the SV process is automatically switched to the external SV system managed by the SV cartridge 13. A switching means may be provided within the main body 22 for manually selecting either the external or internal SV system.

2nd Embodiment

Figure 8:
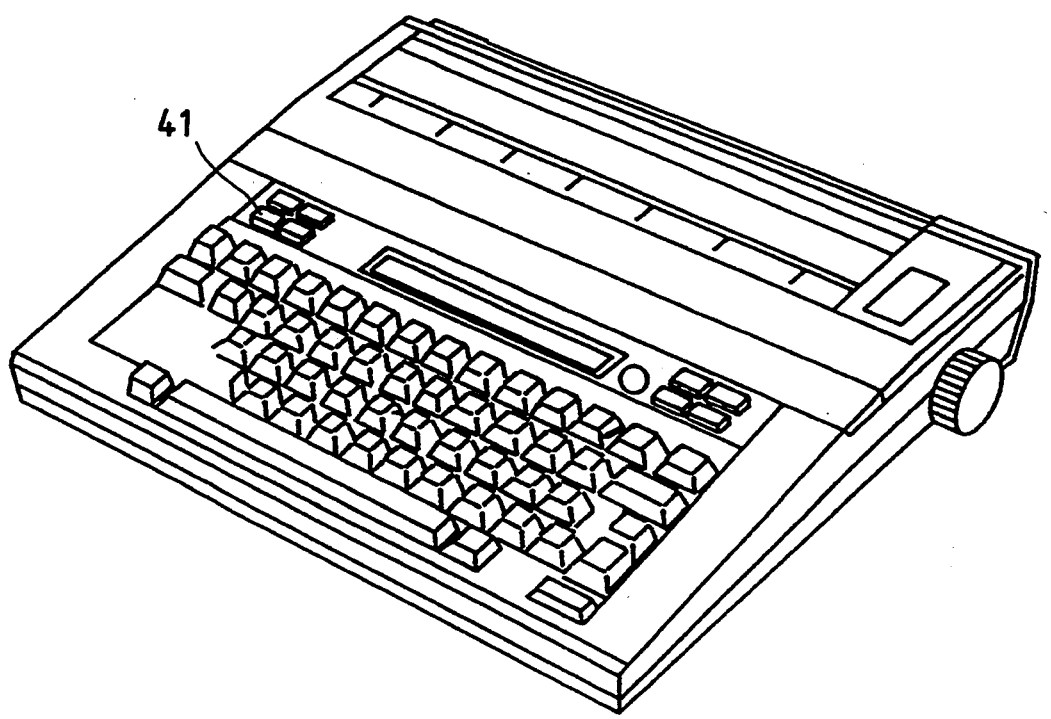
FIG. 8 is a perspective view of the document processing apparatus according to the second embodiment of this invention.

FIG. 8 is a perspective view showing the document processing apparatus according to the second embodiment of this invention. Reference numeral 41 represents an SV system switch with which the external or internal SV system can be operated selectively.

In this embodiment, upon connecting the SV cartridge 13 storing the correct spelling information of the second language to the cartridge connector 12 serving as the connection unit, and upon selection of either the first determining means (in this case, CPU 4) or the second determining means (in this case, CPU 31) by the SV system switch 41 serving as the switching means, CPU 4 serving also as indicating means indicates either the external or internal system as the access destination for the document processing, in accordance with the selection state. CPU 4 or CPU 31 then performs the spelling verification while referring to the dictionary ROM 33 or SV dictionary ROM 17 corresponding to the selected second or first determining means, to thereby perform the composite SV process during the document processing.

Next, the operation of the apparatus shown in FIG. 8 will be described with reference to the flow chart shown in FIG. 9.

Figure 9:
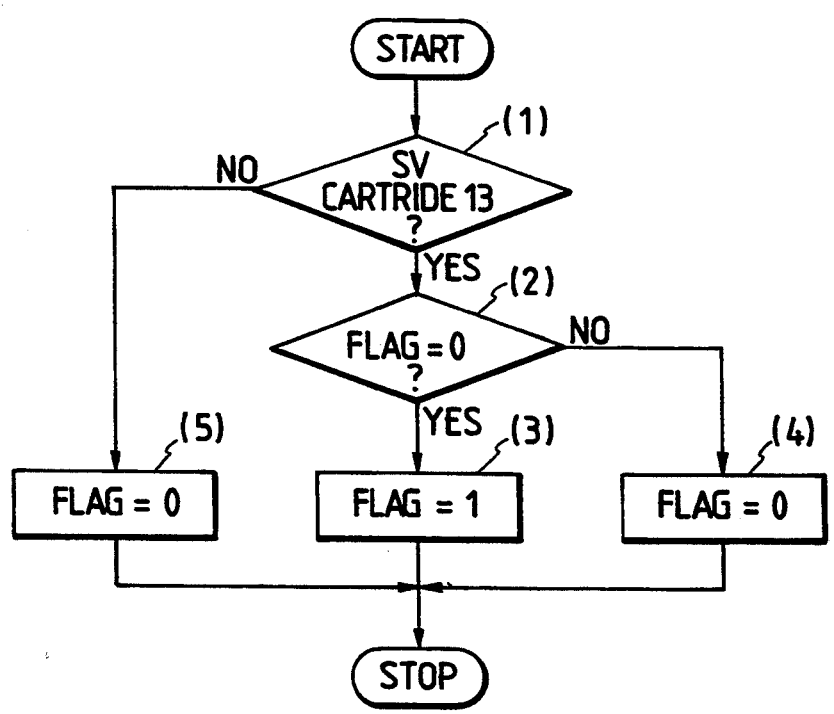
FIG. 9 is a flow chart showing an example of the spelling verification setting procedure of this invention.

The flow chart of FIG. 9 shows an example of the spelling verification setting procedure of this invention, the flow including steps (1) to (4).

First, CPU 4 checks, upon depression of the SV system switch 41, if the SV cartridge 13 is connected or not (step 1). If NO, the flow advances to step 5 to clear an SV flag and set it at "0" (indicating a selection of the internal SV system), thereafter, the procedure is terminated.

If YES at step 1, it is checked if the value of the SV flag is 0 or not (step 2). If YES, the value of the SV flag is set at "1" (step 3) to switch to the external SV system. If NO, the value of the SV flag is set at "0" (step 4) to execute the spelling verification at the internal SV system.

Figure 10:
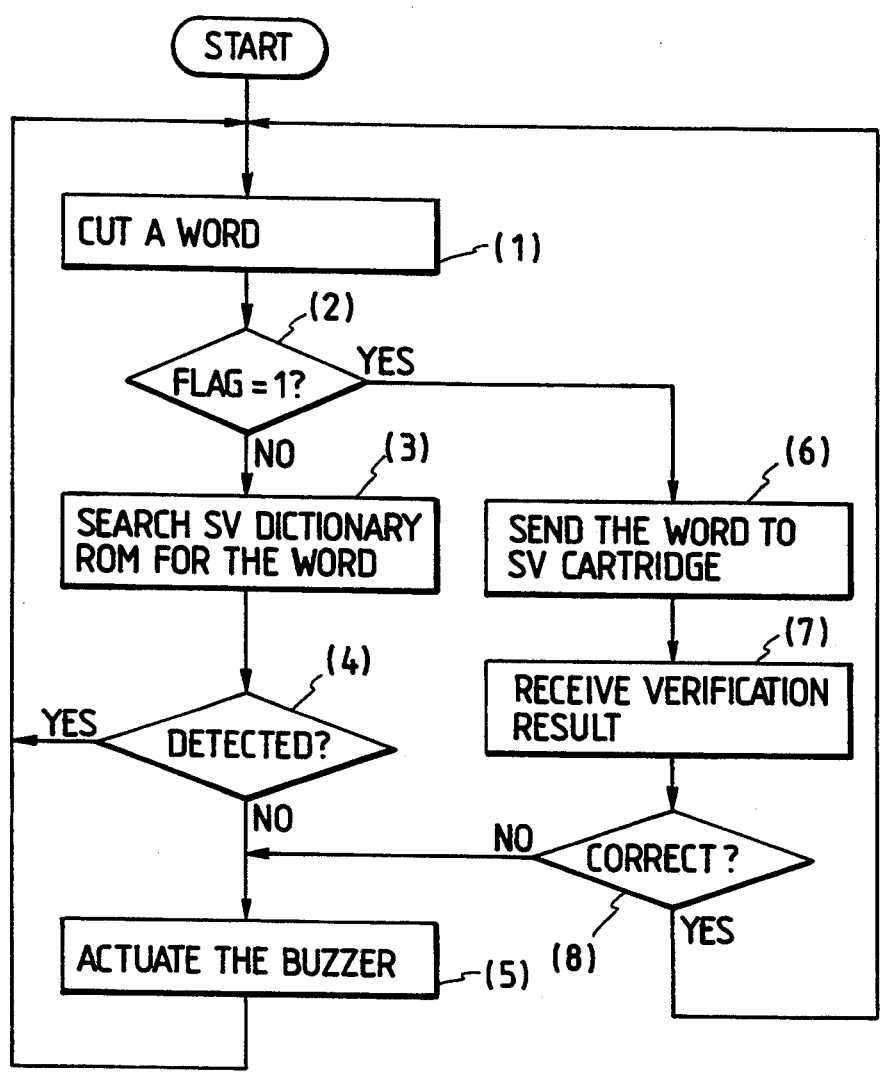
FIG. 10 is a flow chart showing an example of the spelling verification procedure of this invention.

Next, the spelling verification operation will be described with reference to the flow chart of FIG. 10 showing an example of the spelling verification procedure of this invention, the flow including steps 1 to 8.

First, CPU 4 cuts out a word from a document input by an operator (step 1), and checks if the value of the SV flag is "1" or not (step 2). If NO, the SV dictionary ROM 17 is searched for the spelling check by the internal SV system (step 3).

It is then checked if the cut-out word was found in the SV dictionary ROM 17 (step 4). If YES, the flow returns to step 1. If NO, a buzzer is caused to sound for the notice of a misspelling (step 5).

If YES at step 2, the flow advances to step 6 for the spelling check by the external SV system. The cut-out word is sent to the SV cartridge 13 (step 6). The search result is received from CPU 31 (step 7). It is checked if the search result indicates a correct spelling or not (step 8). If YES, the flow returns to step 1, whereas if NO, the flow goes to step 5.

In the above embodiment, the first and second determining means CPU 4 and 31 perform independently from each other the spelling check. However, CPU 4 may be used both as the first and second determining means by providing in the SV cartridge 13 only the dictionary ROM 33, such as shown in FIGS. 11A and 11B.

3rd Embodiment

Figure 11A:
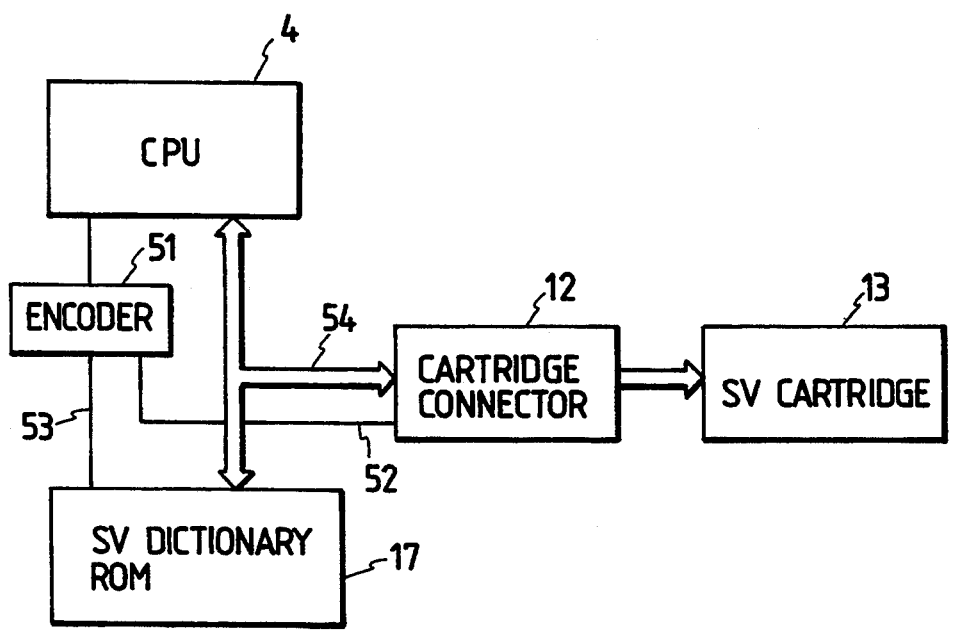
FIGS. 11A and 11B are block diagrams showing the outline and main part of the document processing apparatus according to the third embodiment of this invention.
Figure 11B:
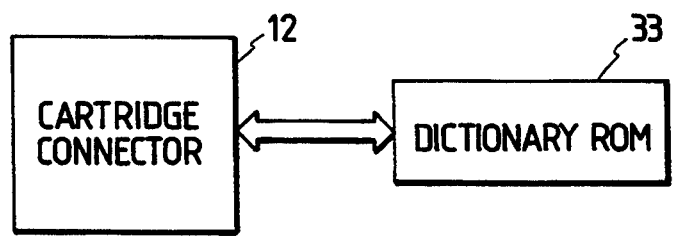

FIGS. 11A and 11B are the block diagrams showing the outline and main part of the document processing apparatus according to the third embodiment of this invention, wherein like parts to those shown in FIG. 1 are represented by using identical reference numerals.

In FIGS. 11A and 11B, reference numeral 51 represents an encoder which sends a chip select signal to a chip select line 52 or 53.

Reference numeral 54 represents a bi-directional bus made of an address bus and data bus. Only the dictionary ROM 33 serving as the second spelling dictionary memory is provided in the SV cartridge 13 connectable to the cartridge connector 12. An access to the dictionary can be selectively performed either externally or internally by the first or second judgement means. The structure of the cartridge connector 12 can thus be made simple.

Figure 12:
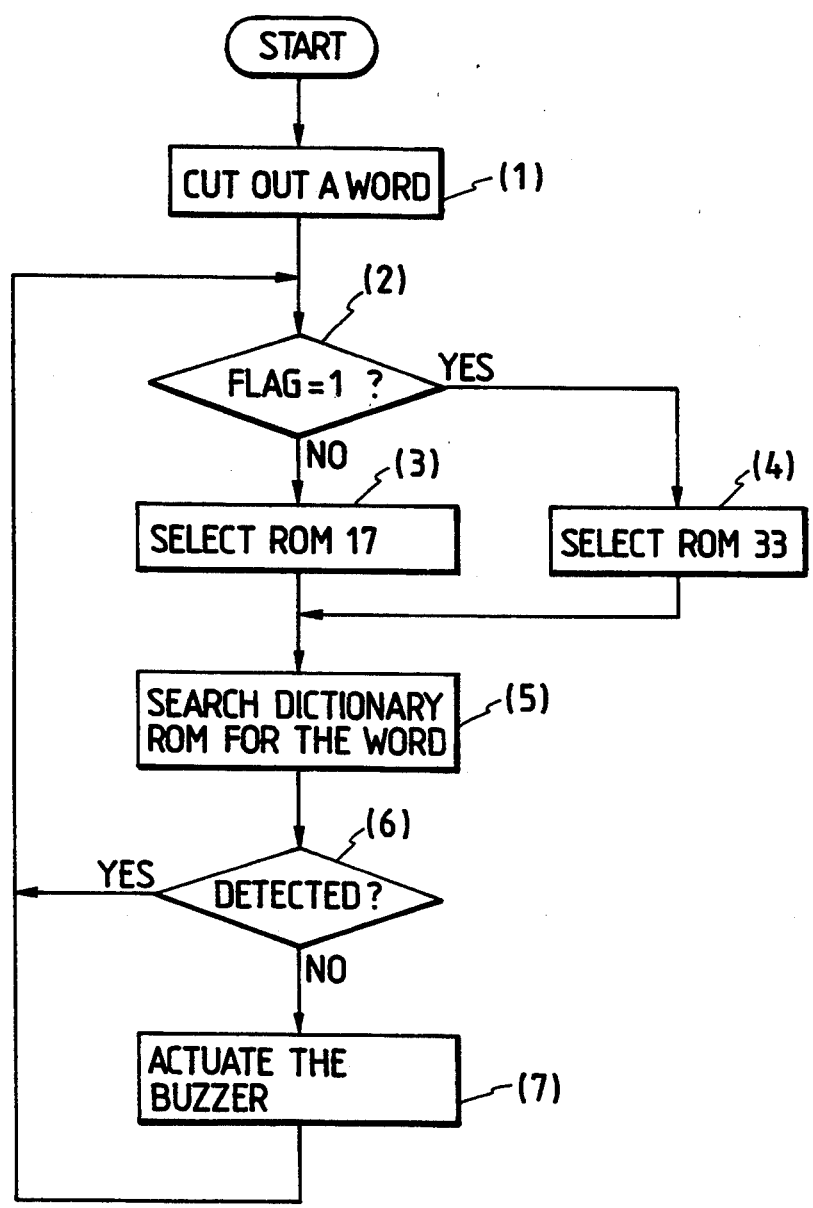
FIG. 12 is a flow chart showing an example of the spelling verification procedure of this invention.

Next, the operation of this embodiment shown in FIGS. 11A and 11B will be described with reference to the flow chart of FIG. 12 showing an example of the spelling verification procedure of this invention, the flow including steps 1 to 7.

First, CPU 4 cuts out a word input from the keyboard 7 (step 1). Next, it is checked if the value of the SV flag is "1" or not (step 2). If NO, a chip select signal is output from CPU 4 to the encoder 51 to thereby select the SV dictionary ROM (internal dictionary) for the spelling verification by the internal SV system (step 3). CPU 4 is then allowed to access the data in the internal SV dictionary ROM 17. Next, the chip-selected dictionary ROM is searched (step 5). It is determined if the word was found in the dictionary ROM (step 6). If YES, the flow returns to step 1, whereas if NO, a buzzer is caused to sound to notify of a misspelling (step 7).

If YES at step 2, a chip select signal is output from CPU 4 to the encoder 51 to thereby select the dictionary ROM (external dictionary) 33 for the spelling verification by the external dictionary ROM (step 4), and thereafter the flow advances to step 5.

The value of the SV flag is being set to "0" at the initial condition.

As appreciated form the foregoing description of this invention, the document processing apparatus comprises a second spelling dictionary memory for storing the second correct spelling information different from the first correct spelling information, the second judgement means for verifying the spelling of a word cut out by the cutting-out means while referring to the second correct spelling information stored in the second spelling dictionary memory, the connection unit for detachably connecting the second determining means to the apparatus main body, and the switching means for switching the spelling check determining process between the first and second determining means in accordance with the connection state of the second determining means connected to the connection unit. It is therefore possible to automatically select and execute the spelling check determining process in accordance with the second correct spelling information different from the first correct spelling information. The SV process for an extended function expected by the future development can therefore be ensured and the document editing process function can be considerably enhanced.

Further, the document processing apparatus of this invention comprises the first determining means for verifying the spelling of a word while referring to the first correct spelling information stored in the first spelling dictionary memory, the second determining means for verifying the spelling of a word different from those stored in the first correct spelling information referred by the first determining means, the connection unit for detachably connecting the second determining means to the apparatus main body, the selecting means for selecting either the first or second determining means for the spelling check determining process, and the indicating means for indicating either the external or internal system as the access destination for the document processing, in accordance with the selection state by the selecting means. The operator can therefore select either the first or second correct spelling information for the spelling check process, to thus allow an optimum selection by the user in accordance with the particular document processing environment. Consequently, during inputting a document, another document of a different language can be readily executed, or the spelling verification may be readily transferred to other spelling check processes, to thereby allow fine spelling verification and composite spelling check operations.

Furthermore, since the second spelling dictionary memory is arranged to be detachably connected to the connection unit, the second determining means and the second spelling dictionary memory can be mounted separately from each other, to thereby realize a compact and cost effective apparatus.

We claim:

1. A document processing apparatus comprising:
    first, internal determining means for verifying the spelling of a word referring to first correct spelling information stored in a first, internal spelling dictionary, said first, internal determining means comprising a first central processing unit;
    section determining means detachably connectable to said apparatus for verifying the spelling of a word different from those stored in the first spelling dictionary referring to second correct spelling information stored in a second spelling dictionary detachably connectable to said apparatus, said second determining means comprising a second central processing unit; and
    a connection unit for detachably connecting said second determining means and the second spelling dictionary to the apparatus main body.

2. A document processing apparatus according to claim 1, further comprising the switching means for switching the spelling verification determining process between said first and second determining means in accordance with the connection state of said second determining means relative to said connection unit.

3. A document processing apparatus according to claim 1, wherein said second determining means includes the second spelling dictionary.

4. A document processing apparatus according to claim 2, wherein said switching means switches the access destination for the document processing to the external or internal determining means, in accordance with the connection state of said second determining means.

5. A document processing apparatus comprising:
first, internal determining means for verifying the spelling of a word referring to first correct spelling information stored in a first, internal spelling dictionary, said first, internal determining means comprising a first central processing unit;
second determining means detachably connectable to said apparatus for verifying the spelling of a word different from those stored in the first spelling dictionary referring to second correct spelling information stored in a second spelling dictionary detachably connectable to said apparatus, said second determining means comprising a second central processing unit;
a connection unit for detachably connection said second determining means and the second spelling dictionary to the apparatus main body; and
designating means for designating which of said first and second determining means is to be used.

6. A document processing apparatus according to claim 5, wherein said second determining means includes the second spelling dictionary.

7. A document processing method comprising the steps of:
verifying, using first verifying means inside a document processing apparatus comprising a first central processing unit, the spelling of a word referring to first correct spelling information stored in a first, internal spelling dictionary; and
verifying, using second verifying means detachably connectable to the document processing apparatus comprising a second central processing unit, the spelling of a word different from those stored in the first spelling dictionary referring to second correct spelling information stored in a second spelling dictionary detachably connectable to the apparatus.

8. A method according to claim 7, further comprising the step of switching a spelling verification process between the first and second verifying means in accordance with the connection state of the second verifying means relative to a connection unit detachably connecting the second verifying means and the second spelling dictionary to a main body of the apparatus.

9. A method according to claim 8, wherein said switching step comprises the step of switching the access destination for document processing to the first or second verifying means, in accordance with the connection state of said the second verifying means.

10. A method according to claim 7, wherein said second verifying means includes the second spelling dictionary.

11. A document processing method comprising the steps of:
verifying, using first verifying means inside a document processing apparatus comprising a first central processing unit, the spelling of a word referring to first correct spelling information stored in a first, internal spelling dictionary; and
verifying, using the second verifying means detachably connectable to the document processing apparatus comprising a second central processing unit, the spelling of a word different for those stored in the first spelling dictionary referring to second correct spelling information stored in a second spelling dictionary detachably connectable to the apparatus; and
designating which of said first and second verifying means is to be used.

12. A method according to claim 11, wherein said second verifying means includes the second spelling dictionary.

13. A document processing apparatus comprising:
a first, internal spelling dictionary for storing first correct spelling information for verifying the spelling of a word;
a second spelling dictionary, detachably connectable to said apparatus, for storing second correct spelling information for verifying the spelling of a word different from those stored in said first spelling dictionary, said second spelling dictionary comprising a central processing unit;
a connection unit for detachably connecting said second spelling dictionary to the main body of said apparatus; and
control means for controlling said apparatus such that the spelling of a word is verified using said first spelling dictionary and for controlling other functions of said apparatus.

14. A document processing apparatus according to claim 13, further comprising the switching means for switching the spelling verification determining process between said first and second dictionaries means in accordance with the connection state of said second dictionary means relative to said connection unit.

15. A document processing apparatus according to claim 14, wherein said switching means switches the access destination for document processing to the first or second dictionaries, in accordance with the connection state of said second dictionary.

16. A document processing apparatus according to claim 13, further comprising determining means for verifying the spelling of a word different from those stored in said first dictionary by referring to said second dictionary, wherein said determining means includes said second spelling dictionary.

17. A document processing apparatus comprising:
first, internal determining means for verifying the spelling of a word referring to first correct spelling information stored in a first, internal spelling dictionary, said first, internal determining means comprising a first central processing unit; and
a connection unit for detachably connecting to the main body of the apparatus, second determining means for verifying the spelling of a word different from those stored in the first, internal spelling dictionary by referring to second correct spelling information stored in a second spelling dictionary detachably connectable to said apparatus, and for detachably connecting the second spelling dictionary to the main body of the apparatus, the second determining means comprising a second central processing unit.

18. A document processing apparatus according to claim 17, further comprising the switching means for switching the spelling verification determining process between said first determining means and the second determining means in accordance with the connection state of the second determining means relative to said connection unit.

19. A document processing apparatus according to claim 18, wherein said switching means switches the access destination for document to the first or second determining means, in accordance with the connection state of the second determining means.

20. A document processing apparatus according to claim 17, wherein the second determining means includes the second spelling dictionary.

21. A document processing apparatus comprising:
a first, internal spelling dictionary for storing first correct spelling information for verifying the spelling of a word;
a connection unit for detachably connecting to the main body of the apparatus, a second spelling dictionary for storing second correct spelling information for verifying the spelling of a word different from those stored in said first, internal spelling dictionary, the second spelling dictionary comprising a central processing unit; and
control means for controlling said apparatus such that the spelling of a word is verified using said first spelling dictionary and for controlling other functions of said apparatus.

22. A document processing apparatus according to claim 21, further comprising the switching means for switching the spelling verification determining process between said first and second dictionaries in accordance with the connection state of the second determining means relative to said connection unit.

23. A document processing apparatus according to claim 22, wherein said switching means switches the access destination for document processing to the first or second dictionaries, in accordance with the connection state of the second dictionary.

24. A document processing apparatus according to claim 21, further comprising determining means for verifying the spelling of a word different from those stored in said first dictionary by referring to said second dictionary, wherein said determining means includes said second spelling dictionary.

25. A document processing apparatus comprising:
a first, internal spelling dictionary for storing first correct spelling information for verifying the spelling of a word;
a second spelling dictionary, detachably connectable to said apparatus, for storing second correct spelling information for verifying the spelling of a word different from those stored in said first spelling dictionary, said second spelling dictionary comprising a central processing unit;
a connection unit for detachably connecting said second spelling dictionary to the main body of said apparatus; and
designating means for designating which of said first and second spelling dictionaries is to be used.

26. An apparatus according to claim 25, wherein said designating means designates which of said first and second spelling dictionaries is to be used in response to connection of said second spelling dictionary to the apparatus main body.

27. A document processing apparatus according to claim 25, further comprising:
first, internal determining means for verifying the spelling of a word referring to first correct spelling information stored in said first, internal spelling dictionary;
second determining means detachably connectable to said apparatus for verifying the spelling of a word different from those stored in the first spelling dictionary referring to second correct spelling information stored in said second spelling dictionary detachably connectable to said apparatus;
said connection unit detachably connecting said second determining means and the second spelling dictionary to the apparatus main body; and
wherein said designating means designates which of said first and second determining means is to be used.

28. A document processing apparatus comprising:
first, internal determining means for verifying the spelling of a word referring to first correct spelling information stored in a first, internal spelling dictionary, said first, internal determining means comprising a first central processing unit;
a connection unit for detachable connecting to the main body of the apparatus, second determining means for verifying the spelling of a word different from those stored in the first spelling dictionary by referring to second correct spelling information stored in a second spelling dictionary detachably connectable to said apparatus, and for detachably connecting the second spelling dictionary to the main body of the apparatus, the second determining means comprising a second central processing unit; and
designating means for designating which of said first and second determining means is to be used.

29. An apparatus according to claim 28, wherein said designating means designates which of said first determining means and the second determining means is to be used in response to connection of the second determining means to the apparatus main body.

30. A document processing apparatus according to claim 28,
further comprising the second determining means,
wherein said connection unit detachably connects said second determining means and the second spelling dictionary to the apparatus main body; and
wherein said designating means designates which of said first and second determining means is to be used.

31. A document processing apparatus comprising:
a first, internal spelling dictionary for storing first correct spelling information for verifying the spelling of a word;
a connection unit for detachably connecting to the main body of said apparatus, a second spelling dictionary for storing second correct spelling information for verifying the spelling of a word different from those stored in said first spelling dictionary, the second spelling dictionary comprising a central processing unit; and
designating means for designating which of said first and second spelling dictionaries is to be used.

32. An apparatus according to claim 31, wherein said designating means designates which of said first spelling dictionary and the second spelling dictionary is to be used in response to connection of the second spelling dictionary to the apparatus main body.

33. A document processing apparatus according to claim 31, further comprising:
first, internal determining means for verifying the spelling of a word referring to first correct spelling information stored in said first, internal spelling dictionary; and
second determining means detachably connectable to said apparatus for verifying the spelling of a word different from those stored in the first spelling dictionary referring to second correct spelling information stored in the second spelling dictionary detachably connectable to said apparatus, wherein said connection unit detachably connects said second determining means and the second spelling dictionary to the apparatus main body, and wherein said designating means designates which of said first and second determining means is to be used.

34. A method of processing documents in a document processing apparatus comprising a first, internal spelling dictionary for storing first correct spelling information for verifying the spelling of a word, a second spelling dictionary, detachably connectable to the apparatus, for storing second correct spelling information for verifying the spelling of a word different from those stored in the first spelling dictionary, the second spelling dictionary comprising a central processing unit, and connection means for detachably connecting the second spelling dictionary to the main body of the apparatus, said method comprising the step of:

controlling the apparatus such that the spelling of a word is verified using the first spelling dictionary in a spelling verification determining process and controlling other functions of the apparatus.

35. A method according to claim 34, further comprising the step of switching the spelling verification determining process between the first and second spelling dictionaries in accordance with the connection state of the second spelling dictionary relative to the connection means.

36. A method according to claim 35, wherein said switching step switches the access destination for document processing to the first or second spelling dictionaries, the accordance with the connection state of the second spelling dictionary.

37. A method according to claim 34, further comprising the step of verifying the spelling of a word different from those stored in the first spelling dictionary by referring to the second spelling dictionary, wherein said verifying step is performed with the second spelling dictionary.

38. A document processing method for processing a document in a document processing apparatus comprising connection means for detachably connecting to a main body of the apparatus, first determining means for verifying the spelling of a word by referring to first correct spelling information store d in a first spelling dictionary detachably connectable to the apparatus, and detachably connecting the first spelling dictionary to the main body of the apparatus, the first determining means comprising a first central processing unit, said method comprising the step of:

verifying the spelling of a word different from those stored in the first spelling dictionary by referring to second correct spelling information stored in a second, internal spelling dictionary with a second, internal determining means comprising a second central processing unit.

39. A method according to claim 38, further comprising the step of switching a spelling verification determining process between the first determining means and the second determining means in accordance with the connection state of the second determining means relative to the connection unit.

40. A method according to claim 39, wherein said switching step switches the access destination for document processing to the first or second determining means, in accordance with the connection state of the second determining means.

41. A method according to claim 38, wherein the second determining means includes the second spelling dictionary.

42. A document processing method for processing a document in a document processing apparatus comprising a first, internal spelling dictionary for storing first correct spelling information for verifying the spelling of a word and connection means for detachably connecting to the main body of the apparatus, a second spelling dictionary for storing second correct spelling information for verifying the spelling of a word different from those stored in the first, internal spelling dictionary, the second spelling dictionary comprising a central processing unit, said method comprising the step of:

controlling the apparatus such that the spelling of a word is verified using said first spelling dictionary and controlling other functions of the apparatus.

43. A method according to claim 42, further comprising the step of switching a spelling verification determining process between the first and second dictionaries in accordance with the connection state of the second determining means relative to the connection unit.

44. A method according to claim 43, wherein said switching step switches the access destination for document processing to the first or second dictionaries, in accordance with the connection state of the second dictionary.

45. A method according to claim 42, further comprising the step of verifying the spelling of a word different from those stored in the first dictionary with determining means by referring to the second dictionary, wherein the determining means includes the second spelling dictionary.

46. A method of processing documents with a document processing apparatus comprising a first, internal spelling dictionary for storing first correct spelling information for verifying the spelling of a word, a second spelling dictionary, detachably connectable to the apparatus, for storing second correct spelling information for verifying the spelling of a word different from those stored in the first spelling dictionary comprising a central processing unit, and connection means for detachably connecting the second spelling dictionary to the main body of the apparatus, said method comprising the step of:

designating which of the first and second spelling dictionaries is to be used.

47. A method according to claim 46, wherein said designating step designates which of the first and second spelling dictionaries is to be used in response to connection of the second spelling dictionary to the apparatus main body.

48. A method according to claim 46, further comprising the steps of:

verifying the spelling of a word referring to first correct spelling information stored in the first, internal spelling dictionary with first, internal determining means; and verifying the spelling of a word different from those stored in the first spelling dictionary referring to second correct spelling information stored in the second spelling dictionary detachably connectable to the apparatus with second determining means, detachably connectable to the apparatus;

wherein said providing step comprises the step of providing the connection unit detachably connecting the second determining means and the second spelling dictionary to the apparatus main body; and wherein said designating step comprising the step of designating which of the first and second determining means is to be used.

49. A method of processing a document with a document processing apparatus comprising a connection unit for detachable connecting to the main body of the apparatus, first determining means for verifying the spelling of a word by referring to first correct spelling information stored in a first spelling dictionary detachably connectable to the apparatus, and for detachably connecting the first spelling dictionary to the main body of the apparatus, the first determining means comprising a first central processing unit, said method comprising the steps of:

verifying the spelling of a word different from those stored in the first spelling dictionary by referring to second correct spelling information stored in a second, internal spelling dictionary, with second, internal determining means comprising a second central processing unit; and designating which of the first and second determining means is to be used.

50. A method according to claim 49, wherein said designating step designates which of the first determining means and the second determining means is to be used in response to connection of the second determining means to the apparatus main body.

51. A method according to claim 49,
further comprising the step of verifying the spelling of a word different from those stored in the first spelling dictionary by referring to second correct spelling information stored in the second spelling dictionary with the second determining means, wherein said providing step comprises the step of providing the connection unit detachably connecting the second determining means and the second spelling dictionary to the apparatus main body; and wherein said designating step designates which of said first and second determining means is to be used.

52. A method of processing a document with a document processing apparatus comprising a first, internal spelling dictionary for storing first correct spelling information for verifying the spelling of a word, and connection means for detachably connecting to the main body of the apparatus, a second spelling dictionary for storing second correct spelling information for verifying the spelling of a word different from those stored in the first spelling dictionary, the second spelling dictionary comprising a central processing unit, said method comprising the step of:

designating which of the first and second spelling dictionaries is to be used.

53. A method according to claim 52, wherein said designating step designates which of the first spelling dictionary and the second spelling dictionary is to be used in response to connection of the second spelling dictionary to the apparatus main body.

54. A method according to claim 52, further comprising:

verifying the spelling of a word referring to first correct spelling information stored in the first, internal spelling dictionary with first, internal determining means; and verifying the spelling of a word different from those stored in the first spelling dictionary referring to second correct spelling information stored in the second spelling dictionary detachably connectable to the apparatus, with second determining means detachably connectable to the apparatus, wherein said providing step comprises the step of providing a connection unit detachably connecting the second determining means and the second spelling dictionary to the apparatus main body, and wherein said designating step designates which of the first and second determining means is to be used.

55. A spelling dictionary detachably connectable to a document processing apparatus having an internal spelling dictionary, said spelling dictionary comprising:

connecting means for detachably connecting said spelling dictionary to the document processing apparatus; and a central processing unit for executing a verification process of the spelling a word, wherein said spelling dictionary stores information different from that stored in the internal spelling dictionary.

56. A spelling dictionary according to claim 55, wherein the apparatus includes means for connecting to said connecting means.

57. A spelling dictionary according to claim 55, wherein the apparatus includes control means for controlling spelling verification of a word based on information stored in the internal spelling dictionary.

58. A spelling dictionary according to claim 57, wherein said control means controls a document processing process of the apparatus.

* * * * *

UNITED STATES PATENT AND TRADEMARK OFFICE
CERTIFICATE OF CORRECTION

PATENT NO. : 5,380,105  
DATED : January 10, 1995  
INVENTOR(S) : NAOKI SHIMADA, et al.

Page 1 of 3

It is certified that error appears in the above-indentified patent and that said Letters Patent is hereby corrected as shown below:

ON THE COVER PAGE

[56] References Cited

FOREIGN PATENT DOCUMENTS

"59-469 4/1984 Japan" should read
--59-59469 4/1984 Japan--; and
"0267769 5/1988 Germany" should read
--0267769 5/1988 European Patent Office--.

SHEET 6 OF THE DRAWINGS

Step (1)

"CARTRIDE 13" should read --CARTRIDGE 13--.

COLUMN 1

Line 41, "communications," should read
--communications--.
Line 55, "signal" should read --single--.

COLUMN 2

Line 6, "the" (first occurrence) should read --a--.
Line 26, "case" should read --case is--.

COLUMN 3

Line 37, "determining" should read --determines--.
Line 43, "judgement" should read --determining--.

UNITED STATES PATENT AND TRADEMARK OFFICE
CERTIFICATE OF CORRECTION

PATENT NO. : 5,380,105 Page 2 of 3

DATED : January 10, 1995

INVENTOR(S) : NAOKI SHIMADA, et al.

It is certified that error appears in the above-indentified patent and that said Letters Patent is hereby corrected as shown below:

COLUMN 7

Line 26, "judgement" should read --determining--.
    Line 57, "judge-" should read --determining--.
    Line 58, "ment" should be deleted.

COLUMN 8

Line 45, "section" should read --second--.
    Line 57, "the" should be deleted.

COLUMN 9

Line 51, "said" should be deleted.
    Line 66, "for" should read --from--.

COLUMN 10

Line 26, "the" should be deleted.
    Line 28, "means" should be deleted.
    Line 30, "means" should be deleted.
    Line 60, "the" should be deleted.

COLUMN 11

Line 22, "the" should be deleted.

COLUMN 12

Line 15, "detachable" should read --detachably--.

UNITED STATES PATENT AND TRADEMARK OFFICE
CERTIFICATE OF CORRECTION

PATENT NO. : 5,380,105

DATED : January 10, 1995

INVENTOR(S) : NAOKI SHIMADA, et al.

It is certified that error appears in the above-indentified patent and that said Letters Patent is hereby corrected as shown below:

COLUMN 13

Line 48, "store d" should read --stored--.

COLUMN 15

Line 3, "comprising" should read --comprises--.
Line 8, "detachable" should read --detachably--.

Signed and Sealed this

Sixteenth Day of May, 1995

Attest:

BRUCE LEHMAN

Attesting Officer

Commissioner of Patents and Trademarks